United States Patent
Kaufhold et al.

(10) Patent No.: US 6,869,999 B2
(45) Date of Patent: Mar. 22, 2005

(54) PROCESS FOR THE PREPARATION OF THERMOPLASTIC, NON-TACKY POLYURETHANES

(75) Inventors: Wolfgang Kaufhold, Köln (DE); Eva Gestermann, Köln (DE); Wolfgang Röhrig, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/715,236

(22) Filed: Nov. 17, 2003

(65) Prior Publication Data

US 2004/0102599 A1 May 27, 2004

(30) Foreign Application Priority Data

Nov. 22, 2002 (DE) .......................................... 102 54 600

(51) Int. Cl.$^7$ ................................................. C08G 18/82
(52) U.S. Cl. ........................ 524/589; 524/590; 264/140
(58) Field of Search ................................ 524/589, 590; 264/140

(56) References Cited

U.S. PATENT DOCUMENTS

| 3,953,389 | A | | 4/1976 | Holliday et al. | ....... 260/23.7 M |
| 4,289,825 | A | | 9/1981 | Kolycheck et al. | ......... 428/407 |
| 5,218,058 | A | | 6/1993 | Zeitler et al. | ............... 525/453 |
| 6,080,823 | A | * | 6/2000 | Kiriazis | ...................... 525/438 |
| 6,294,638 | B1 | | 9/2001 | Manning et al. | .............. 528/76 |

FOREIGN PATENT DOCUMENTS

| CA | 2313456 | 6/1999 |
| DE | 31 32 760 | 3/1983 |
| DE | 198 58 906 | 6/2000 |
| DE | 101 09 302 | 9/2002 |
| WO | 99/18148 | 4/1999 |
| WO | 02/090454 | 11/2002 |

* cited by examiner

*Primary Examiner*—Rachel Gorr
(74) *Attorney, Agent, or Firm*—Joseph C. Gil; Lyndanne M. Whalen

(57) ABSTRACT

Thermoplastic polyurethanes (TPU) with a low tendency towards surface tackiness of the granules are prepared by applying at least one wetting agent satisfying specified criteria and at least one solid powdering agent to the TPU before and/or after comminution of the TPU.

2 Claims, No Drawings

PROCESS FOR THE PREPARATION OF THERMOPLASTIC, NON-TACKY POLYURETHANES

BACKGROUND OF THE INVENTION

The invention relates to a process for the preparation of thermoplastic polyurethanes (TPU) with a low tendency towards granule surface tackiness.

It is known that granules of aliphatic TPU based on isophorone-diisocyanate (IPDI) or based on 4,4'-, 2,4'- and 2,2'-dicyclohexylmethane-diisocyanate and isomer mixtures thereof ($H_{12}$-MDI) tend towards surface tackiness (See, e.g., EP-A 1090940), even if these TPU contain the known waxes and/or release agents.

This surface tackiness, which also arises in soft (Shore A hardness<80) TPU based on hexamethylene-diisocyanate (HDI) and methylene-diisocyanate (MDI) also occurs in TPU based on $H_{12}$-MDI and IPDI in hard products in the region of a Shore D hardness of >40.

Shaped articles of these aliphatic TPU are employed in all instances where a good light stability and high transparency are required, such as flexible windscreens (e.g. cabriolet rear screens), an elastic intermediate layer in safety glazing, etc.

Soft thermoplastics, such as aliphatic TPU, must be stored and transported in drums at temperatures of approx. 10–40° C., since after storage and transportation the granules must be still be free-flowing (no agglomeration) so that they can be handled during further processing. Furthermore, aliphatic TPU must be dried before processing at temperatures of >50° C. in order to avoid a molecular weight degradation during the processing, and agglomeration after the drying should also be avoided (maintaining of the free-flowing properties).

Simple application of known waxes and/or release agents to the granules is not sufficient to obtain free-flowing granules which are also still free-flowing after any drying.

SUMMARY OF THE INVENTION

The object of the present invention is to provide a process which prevents or reduces tackiness of aliphatic TPU granules on the surface, so that free-flowing granules which can be further dried without damage are obtained. The light stability and the transparency of the shaped articles produced from this TPU should not be adversely influenced.

Surprisingly, it has been possible to achieve this object by the process according to the invention in which a liquid wetting agent is first applied to the TPU and a solid powdering agent is subsequently applied to the TPU.

DETAILED DESCRIPTION OF THE PRESENT INVENTION

The invention provides a process for the preparation of granules from thermoplastic polyurethanes (TPU), which are obtainable by reaction of
A) a cycloaliphatic diisocyanate with
B) at least one polyol having a number-average molecular weight of between 600 and 8,000 g/mol and
C) at least one chain-lengthening agent having a number-average molecular weight of between 60 and 500 g/mol with the addition of
D) optionally, a catalyst and
E) optionally, a conventional auxiliary substance and/or additive, in which before and/or after the comminution of the thermoplastic polyurethane (TPU), in succession a) one or more wetting agents which are liquid at a temperature of at least 30° C., preferably wetting agents which are liquid at a temperature of at least 20° C., in a concentration of from about 0.01 to about 0.5 wt. %, preferably from 0.03 to 0.3 wt. %, most preferably, from 0.05 to 0.3 wt. %, based on the sum of A, B and C, are applied to the TPU and thereafter b) one or more solid powdering agents with a melting temperature of $\geq 50°$ C., preferably $\geq 60°$ C., in a concentration of 0.01 to 0.5 wt. %, preferably 0.02 to 0.2 wt. %, based on the sum of A, B and C, are applied to the TPU.

Cycloaliphatic diisocyanate(s) (component A) which is/are useful in the practice of the present invention include, preferably 1,4-cyclohexane-diisocyanate, 1-methyl-2,4-cyclohexane-diisocyanate, 1-methyl-2,6-cyclohexane-diisocyanate and isomer mixtures thereof, isophorone-diisocyanate (IPDI), 4,4'-, 2,4'- and 2,2'-dicyclohexylmethane-diisocyanate ($H_{12}$-MDI) and isomer mixtures thereof.

Linear hydroxyl-terminated polyols having a number-average molecular weight of 600 to 8,000 g/mol, preferably 700 to 4,200 g/mol, are useful as component B). These often contain small amounts of non-linear compounds as a result of the process used for their production. Such polyols are therefore often referred to as "substantially linear polyols".

Suitable polyester diols can be prepared, for example, from dicarboxylic acids having from 2 to 12 carbon atoms, preferably from 4 to 6 carbon atoms, and polyhydric alcohols. Possible dicarboxylic acids useful for the production of such polyester diols are: aliphatic dicarboxylic acids, such as succinic acid, glutaric acid, adipic acid, suberic acid azelaic acid and sebacic acid, and aromatic dicarboxylic acids, such as phthalic acid, isophthalic acid and terephthalic acid. The dicarboxylic acids can be used individually or as mixtures, e.g. in the form of a succinic, glutaric and adipic acid mixture. For preparation of the polyester diols it may be advantageous, where appropriate, to use the corresponding dicarboxylic acid derivatives, such as carboxylic acid diesters having from 1 to 4 carbon atoms in the alcohol radical, carboxylic acid anhydrides or carboxylic acid chlorides, instead of the dicarboxylic acids. Examples of polyhydric alcohols are glycols having from 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. The polyhydric alcohols can be used by themselves or optionally as a mixture with one another, depending on the desired properties. Other compounds which are suitable are esters of carbonic acid with the diols mentioned, in particular, those having from 4 to 6 carbon atoms, such as 1,4-butanediol or 1,6-hexanediol, condensation products of hydroxycarboxylic acids, for example, hydroxycaproic acid, and polymerization products of lactones, for example, optionally substituted caprolactones. Ethanediol polyadipates, 1,4-butanediol polyadipates, ethanediol-1,4-butanediol polyadipates, 1,6-hexanediol-neopentylglycol polyadipates, 1,6-hexanediol-1, 4-butanediol polyadipates and polycaprolactones are preferably used as polyester diols. The polyester diols have average molecular weights of 600 to 8,000, preferably 700 to 4,200, and can be used individually or in the form of mixtures with one another.

Suitable polyether diols can be prepared by reacting one or more alkylene oxides having from 2 to 4 carbon atoms in the alkylene radical with a starter molecule which contains two bonded active hydrogen atoms. Alkylene oxides which may be mentioned are, e.g.,: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably employed. The alkylene oxides can be used individually, alternately in succession or as mixtures. Possible starter molecules are, for example: water, amino alcohols, such as N-alkyl-diethanolamines, for example, N-methyl-diethanolamine, and diols, such as ethylene glycol, 1,3-propylene glycol, 1,4-butanediol and 1,6-hexanediol. Mixtures of starter molecules can optionally also be employed. Suitable polyether diols are the polymerization products of tetrahydrofuran which contain hydroxyl groups. Trifunctional polyethers can also be employed in amounts of from 0 to 30 wt. %, based on the weight of the bifunctional polyethers, but at most in an amount such that a product which can be processed as a thermoplastic is formed. The substantially linear polyether-diols have molecular weights of from 600 to 8,000, preferably from 700 to 4,200. They can be used either individually or in the form of mixtures with one another.

Diols or diamines having on average from 1.8 to 3.0 Zerewitinoff-active hydrogen atoms per molecule and a number-average molecular weight of from 60 to 500 g/mol are useful as component C). Aliphatic diols having from 2 to 14 carbon atoms, such as ethanediol, 1,6-hexanediol, diethylene glycol, dipropylene glycol and, in particular, 1,4-butanediol are preferred. However, diesters of terephthalic acid with glycols having from 2 to 4 carbon atoms, such as terephthalic acid bis-ethylene glycol or terephthalic acid bis-1,4-butanediol, hydroxyalkylene ethers of hydroquinone, such as 1,4-di($\beta$-hydroxyethyl)-hydroquinone, and ethoxylated bisphenols, such as 1,4-di($\beta$-hydroxyethyl)-bisphenol A, are also suitable. (Cyclo) aliphatic diamines, such as isophoronediamine, ethylenediamine, 1,2-propylene-diamine, 1,3-propylene-diamine, N-methyl-propylene-1,3-diamine and N,N'-dimethyl-ethylenediamine, and aromatic diamines, such as 2,4-toluylene-diamine and 2,6-toluylene-diamine, 3,5-diethyl-2,4-toluylene-diamine and/or 3,5-diethyl-2,6-toluylene-diamine and primary mono-, di-, tri- and/or tetraalkyl-substituted 4,4'-diaminodiphenylmethanes are also suitable. Mixtures of the above-mentioned chain-lengthening agents can also be employed. In addition, relatively small amounts of triols can be added.

Conventional monofunctional compounds can also be employed in small amounts, e.g., as chain terminators or mold release aids. Examples of such conventional materials include alcohols, such as octanol and stearyl alcohol, and/or amines, such as butylamine and stearylamine.

To prepare the TPUs, the builder components, optionally in the presence of one or more catalysts, auxiliary substances and/or additives, may be reacted, preferably in amounts such that the equivalence ratio of NCO groups to the sum of NCO-reactive groups, in particular, OH groups of the low molecular weight chain lengtheners and polyols, is from 0.9:1.0 to 1.1:1.0, preferably from 0.95:1.0 to 1.10:1.0.

Suitable catalysts (D) are the conventional tertiary amines known from the prior art, such as triethylamine, dimethylcyclohexylamine, N-methylmorpholine, N,N'-dimethyl-piperazine, 2-(dimethylamino-ethoxy)-ethanol, diazabicyclo-(2,2,2)-octane and the like, and, in particular, organometallic compounds, such as titanic acid esters, iron compounds and tin compounds, e.g., tin diacetate, tin dioctoate, tin dilaurate or the tin-dialkyl salts of aliphatic carboxylic acids, such as dibutyltin diacetate, dibutyltin dilaurate or the like. Preferred catalysts are organometallic compounds, in particular titanic acid esters and compounds of iron and/or tin.

In addition to the TPU components and the catalysts, auxiliary substances and/or additives (E) can also be added in an amount of up to 20 wt. %, based on the total amount of TPU. They can be predissolved in one of the TPU components, preferably in component B), or also, where appropriate, metered in, after the reaction has taken place, in a subsequent mixing unit, such as an extruder.

Examples of such auxiliary substances and/or additives (E) are lubricants, such as fatty acid esters, metal soaps thereof, fatty acid amides, fatty acid ester-amides and silicone compounds, antiblocking agents, inhibitors, stabilizers against hydrolysis, light, heat and discoloration, flameproofing agents, dyestuffs, pigments, inorganic and/or organic fillers and reinforcing agents. Reinforcing agents are, in particular, fibrous reinforcing substances, such as inorganic fibers, which are prepared according to the prior art and can also be charged with a size. Further details of the auxiliary substances and additives mentioned may be found in the technical literature, for example, the monograph by J. H. Saunders and K. C. Frisch "High Polymers", volume XVI, Polyurethane, part 1 and 2, Verlag Interscience Publishers 1962 and 1964 and the Taschenbuch für Kunststoff-Additive by R. Gächter and H. Müller (Hanser Verlag Munich 1990).

The TPU can be prepared by the known extruder or belt process or by the process described in published application PCT/EP98/07753.

One or more of the following compounds can be employed as wetting agent(s) which is/are liquid at temperatures of $\leq 30°$ C. (melting temperature T$\leq 30°$ C.):

a) saturated and unsaturated carboxylic acids and polycarboxylic acids, such as caproic acid, oleic acid, palmitoleic acid, linoleic acid, linolenic acid and ricinoleic acid, b) liquid alcohols and polyols, such as fatty alcohols having up to 12 C atoms, e.g., octanol, lauryl alcohol, oleyl alcohol and linoleyl alcohol, and polyols, e.g., ethylene glycol, propylene glycol, diethylene glycol, propanediol, butanediol, pentanediol and glycerol, c) liquid polyglycols (e.g., polyethylene glycols, polypropylene glycols) and esters and ethers thereof, such as fatty acid polyglycol esters, d) aliphatic diamines based on polyglycol, such as that which is sold under the name Jeffamine® (Huntsman), e) liquid esters of saturated or unsaturated aliphatic carboxylic acids, such as lauric acid, stearic acid, oleic acid, erucic acid, palmitic acid, citric acid, 12-hydroxystearic acid and ricinoleic acid, or of polycarboxylic acids, such as succinic acid, glutaric acid, adipic acid, suberic acid, azelaic acid, sebacic acid and cyclohexanedicarboxylic acid, with mono-ols, such as fatty alcohols, or polyols, such as glycols (e.g., ethylene or propylene glycol, diethylene glycol, triethylene glycol), polyglycols, glycerol or pentaerythrityl alcohols (The polyols can be completely or only partly esterified; in the latter case, the esters still have free hydroxyl groups.), f) liquid "complex esters": mixtures of a) aliphatic, cycloaliphatic or aromatic dicarboxylic acids, such as succinic acid, glutaric acid, adipic acid, suberic acid, azelaic acid, sebacic acid, cyclohexanedicarboxylic acid, phthalic acid, isophthalic acid and terephthalic acid, b) polyols, such as glycols, glycerol, pentaerythrityl alcohol or polyglycols, and c) aliphatic monocarboxylic acids, such as lauric acid, palmitic acid, stearic acid, oleic acid and erucic acid (The esterification can be complete or only partial; in the latter case the compounds still have free hydroxyl groups.), g) plasticizers:
   i) aliphatic dicarboxylic acid esters, e.g. adipates, such as dioctyl or dibutyl adipate, or sebacates, such as dioctyl. or dibutyl sebacate,
   ii) aromatic dicarboxylic acid esters, e.g. phthalates, such as dioctyl phthalate or dibutyl phthalate, iii) trimellitates,
iv) benzoic acid esters, such as diethylene and dipropylene glycol dibenzoate,
v) polyesters based, for example, on adipic acid and butanediol,
vi) phosphoric acid esters, such as tricresyl phosphate,
vii) fatty acid esters, such as butyl oleate and butyl stearate,
viii) hydroxycarboxylic acid esters, e.g., esters of citric acid, tartaric acid, lactic acid and ricinoleic acid,
ix) epoxide plasticizers, such as epoxidized soya or linseed oil and derivatives thereof,
h) polyolefin hydrocarbons and naturally occurring and synthetic polyolefins,
i) oxidized polyolefins and derivatives thereof, such as acids or esters,
j) silicone oils,
k) fluorinated compounds, such as perfluorolauric acid, and
l) liquid paraffins, e.g., white oil.

One or more compounds from the abovementioned groups b), c), e), f) and g) are particularly preferred as the liquid wetting agents, most preferred are those from group e).

One or more of the following compounds can be employed as solid powdering agents having a melting temperature of $\geq 50°$ C.:
a) saturated and unsaturated carboxylic acids and polycarboxylic acids, such as myristic acid, palmitic acid, stearic acid, behenic acid, cerotic acid, montan acids and carnauba wax acids,
b) low molecular weight, oligomeric or polymeric mono-ols or polyols which have at least 12 C atoms, such as higher fatty alcohols and wax alcohols,
c) polyglycols (polyethylene glycols, polypropylene glycols) and esters and ethers thereof,
d) amides which can be derived from aliphatic carboxylic acids or polycarboxylic acids, such as oleic acid amide, stearylamide, erucylamide, palmitamide, behenic acid amide, laurylamide, oleylpalmitamide, ethylenebisstearylamide, ethylenebisoleamide and erucylstearamide,
e) esters which can be prepared from monocarboxylic acids or polycarboxylic acids, such as lauric acid, stearic acid, oleic acid, erucic acid, palmitic acid, citric acid, 12-hydroxystearic acid, ricinoleic acid, benzoic acid, phthalic acids, succinic acid, glutaric acid, adipic acid, suberic acid, azelaic acid, sebacic acid and cyclohexanedicarboxylic acid, with mono-ols, such as fatty and wax alcohols, or with polyols, such as glycols, glycerol, pentaerythrityl alcohol or polyglycols (The esterification can be complete or only partial; in the latter case, the compounds still have free hydroxyl groups. Examples are stearic acid esters, such as pentaerythrityl stearate and glycerol mono-, bis- and tristearate, dicarboxylic acid esters of fatty alcohols, hydrogenated castor oil, montan acid esters and fatty alcohol fatty acid esters.),
f) fatty acid ester-amides, such as ethylene-stearylamide-stearic acid ester,
g) "complex esters": mixed esters of a) aliphatic, cycloaliphatic or aromatic dicarboxylic acids, such as succinic acid, glutaric acid, adipic acid, suberic acid, azelaic acid, sebacic acid, cyclohexanedicarboxylic acid, phthalic acid, isophthalic acid and terephthalic acid, with b) polyols, such as glycols, glycerol, pentaerythrityl alcohol and polyglycols, and c) aliphatic monocarboxylic acids, such as lauric acid, palmitic acid, stearic acid, erucic acid and montan acids (The esterification can be complete or only partial, and in the latter case the compounds still have free hydroxyl groups. Partial metal saponification of the ester groups is also possible.),
h) metal soaps, such as the alkali metal and alkaline earth metal salts of oleic acid, palmitic acid, stearic acid, montan acid, erucic acid or cerotic acid,
i) mixtures of esters and carboxylates of a carboxylic acid, such as calcium montanate and montan acid esters,
j) polyolefin waxes,
k) polar polyolefin waxes and their derivatives, and
l) paraffins.

One or more compounds from the abovementioned groups d), e), f), g) and i) are particularly preferred as solid powdering agents, most preferred are those from groups g) and i).

The treatment with the wetting and powdering agents can in principle be carried out before and/or after the comminution. In the case of TPU preparation by the extruder process, in particular, the treatment can be carried out at various points.

It is in principle possible for both agents (wetting and powdering agent) to be added before the comminution. Before the comminution as used herein means that the two agents are applied successively after exit of the melt from the extruder, in the case of strand granulation, preferably during cooling on the belt or shortly before granulation. After the comminution in the case of strand granulation preferably means that the two agents are applied in succession after cooling on the belt and shortly before the granulation. In the case of underwater granulation, the agents are applied to the granules after the water has been separated off (the liquid wetting agent can also be added to the water).

Preferably, it is also possible for the liquid wetting agent to be applied first before the comminution and for the solid powdering agent to be applied after the comminution.

In the case of granules with a particularly pronounced surface tackiness, the two agents can be applied before and after the comminution.

The wetting agent or agents which is or are liquid at $\leq 30°$ C. should preferably be applied to the TPU in a concentration of from 0.01 to 0.5 wt. %, based on the sum of the weights of A, B and C. Amounts of <0.01 wt. % are not sufficient and amounts of >0.5% are not necessary from the economic aspect.

The solid powdering agent or agents with a melting temperature of $\geq 50°$ C. should preferably be applied to the TPU in a concentration of from 0.01 to 0.5 wt. %, based on the sum of the weights of A, B and C. Amounts of <0.01 wt. % are not sufficient and amounts of >0.5 wt. % are not necessary from the economic aspect. The invention is explained in more detail with the aid of the following examples.

EXAMPLES

Preparation of the TPU

The TPU were prepared continuously as follows in the prepolymer process:

A mixture of Terathane® 1000 polyether glycol, antioxidant, Tinuvin® 328 stabilizer and dibutyltin dilaurate was heated to approx. 90° C. in a tank, while stirring, and was then heated continuously to approx. 180° C. in a heat exchanger. This mixture was then brought together with $H_{12}$-MDI (room temperature), and after a dwell time of approx. 30 sec was passed into the second housing of a screw (ZSK 83). The butanediol (approx. 60° C.) was also metered into the second housing of the ZSK 83. Wachs OP was metered into the intake of this ZSK 83.

The entire mixture reacted in the extruder until the reaction was complete, and was then granulated.

Composition of the TPU
a) 1.0 mol Terathane® 1000 polyether glycol
b) 3.57 mol 1,4BDO
c) 4.57 mol $H_{12}$-MDI
400 ppm DBTL (based on the Terathane® 1000 polyether polyol)
1.0 wt. % Tinuvin® 328 stabilizer (based on a)+b)+c))
0.8 wt. % Irganox® 1010 antioxidant (based on a)+b)+c))
0.7wt. % Wachs OP (based on a)+b)+c))

After granulation, the granules were removed from the granulator and treated as described below.

Comparison Example A

Untreated TPU

Comparison Example B 0.2 wt. % of Wachs OP (based on a)+b)+c)) were powdered on to the TPU and the components were mixed in a mixer for approx. 2 hours at room temperature (RT).

Example C (According to the Invention)

In a first step, 0.1 wt. % (based on a)+b)+c)) Loxiol® G40 ester was added to the TPU and the components were mixed in a mixer for approx. 2 hours at RT. Thereafter, 0.1 wt. % (based on a)+b)+c)) of Wachs OP powder were added to the TPU and the components were mixed in a mixer for approx. 2 hours at RT.

Comparison Example D

In a further experiment, after granulation, the granules were blown into a delivery tube for packing up. In this case, after the granulator approx. 0.1 wt. % (based on a)+b)+c)) of the solid Wachs OP was metered into the granulator/stream of air.

Example E (According to the Invention)

In a further experiment, after the granulation, the granules were blown into a delivery tube for packing up. In this case, after the granulator, approx. 0.1 wt. % of liquid Loxiol® G40 ester (based on a)+b)+c)) was sprayed into the granulator/stream of air. Approx. 1 m thereafter approx. 0.1 wt. % of the solid Wachs OP (based on a)+b)+c)) was metered into the granulator/stream of air.

The granule tackiness test described in the following was carried out with the granules from each of Examples A to E.
Tackiness Test on Granules from Examples A to E In order to test the tackiness of granules, the cylinder intended for this test (internal diameter=44 mm; height=58 mm) was placed in an aluminum dish and 20 g of the granules to be tested were introduced into the cylinder.

These granules were loaded with a weight weighing 500 g (stamp: internal diameter=41 mm) and stored for approx. 15 h at 70° C. in a circulating air drying cabinet.

The tackiness of the granules was tested on the still hot granules. For this, the cylinder was raised and the granules were evaluated qualitatively according to the following criteria:

1. Granules tacky (severe sticking or totally lumped together)
2. Granules free-flowing Results:

| | Granule tackiness | Comment |
|---|---|---|
| Comparison Example A | totally lumped together (also after cooling) | |
| Comparison Example B | severe sticking | a lot of Wachs OP on the container wall |
| Example C according to the invention | free-flowing | little Wachs OP on the container wall |
| Comparison Example D | severe sticking | a lot of Wachs OP on the container wall and on the delivery tubes |
| Example E according to the invention | free-flowing | little Wachs OP on the container wall and on the delivery tubes |

| | |
|---|---|
| DBTL: | Dibutyltin dilaurate |
| Terathane ® 1000: | Polytetrahydrofuran-diol with an average molecular weight $\overline{M}_n$ of approx. 1,000 g/mol (DuPont) |
| 1,4BDO: | 1,4-Butanediol |
| $H_{12}$—MDI: | Isomer mixture of dicyclohexylmethane-diisocyanate |
| Irganox ® 1010: | Tetrakis[methylene-(3,5-di-tert-butyl-4-hydroxyhydrocinnamate)]methane (Ciba Geigy) |
| Tinuvin ® 328: | 2-(2'-Hydroxy-3',5'-di-tert-amylphenyl)benzotriazole (Ciba Spezialitatenchemie) |
| Loxiol ® G40: | Neutral, liquid ester wax from Cognis |
| Wachs OP: | Mixture of montan acid esters and calcium montanate from Clariant |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of granules from a thermoplastic polyurethane which is the reaction product of
   A) a cycloaliphatic diisocyanate with
   B) at least one polyol having a number-average molecular weight between 600 and 8,000 g/mol and
   C) at least one chain-lengthening agent having a number-average molecular weight between 60 and 500 g/mol with the addition of
   D) optionally, a catalyst and
   E) optionally, a conventional auxiliary substance and/or additive, comprising
   (1) applying in succession
   (a) at least one wetting agent which is liquid at ≦30° C. in a concentration of 0.01 to 0.5 wt. %, based on the sum of the weights of A, B and C, and thereafter
   (b) at least one solid powdering agent with a melting temperature of ≧70° C. in a concentration of 0.01 to 0.5 wt. %, based on the sum of the weights of A, B and C to the thermoplastic polyurethane before and/or after
   (2) comminuting the thermoplastic polyurethane.
2. The granules produced by the process of claim 1.

* * * * *